(12) United States Patent
Mayak et al.

(10) Patent No.: US 6,498,931 B1
(45) Date of Patent: Dec. 24, 2002

(54) CID MESSAGE RETRIEVAL METHODS AND DEVICES

(75) Inventors: Barbara Mayak, Whitehall, PA (US); John R. McElwee, Allentown, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/245,715

(22) Filed: Feb. 8, 1999

(51) Int. Cl.⁷ .............................................. H04M 3/42
(52) U.S. Cl. .................. 455/415; 379/142.01; 340/7.52
(58) Field of Search ................. 379/142, 127; 455/415, 414; 340/7.44, 7.52, 7.22, 7.21, 7.23

(56) References Cited

U.S. PATENT DOCUMENTS

| | | | | |
|---|---|---|---|---|
| 4,172,969 A | * | 10/1979 | Levine | 379/70 |
| 4,868,560 A | * | 9/1989 | Oliwa | 340/7.22 |
| 4,942,598 A | * | 7/1990 | Davis | 340/7.31 |
| 5,103,449 A | * | 4/1992 | Jolissaint | 370/384 |

* cited by examiner

Primary Examiner—Vivian Chin
Assistant Examiner—James K Moore
(74) Attorney, Agent, or Firm—John E. Curtin, Esq.; Troutman Sanders LLP (57) ABSTRACT

Message retrieval methods and devices allow for the remote retrieval of caller identity delivery ("CID") information or messages stored in telephones, telephone answering devices ("TAD") and the like through the use of dual-tone, multi-frequency ("DTMF") signals.

114 Claims, 2 Drawing Sheets

CID MESSAGE RETRIEVAL METHODS AND DEVICES

BACKGROUND OF THE INVENTION

The number and usage of CID storage devices and other similar message storage devices has grown over the last few years. Typically, these devices store CID information which can only be "retrieved" by visually viewing the information or messages on a display screen or the like. The messages most commonly take the form of a telephone number.

The need to visually retrieve messages imposes certain limitations on the use of these devices. For example, if a user of such a device is remotely located from the device it is practically impossible to retrieve messages.

Accordingly, it is an object of the present invention to provide for methods and devices which allow for the remote retrieval of stored CID information or messages.

It is another object of the invention to provide for a programmed device, such as a microprocessor, digital signal processor or any combination of components which perform similar functions, which comprises a program memory and program code for sending or transmitting CID information or messages.

Other objectives, features and advantages of the present invention will become apparent to those skilled in the art from the following description taken in conjunction with the accompanying drawings.

SUMMARY OF THE INVENTION

In accordance with the present invention there are provided devices for sending CID information to a remote communications device. Such devices may comprise: receiving means or a receiving unit for receiving an input signal, where the input signal may comprise an access code, local input signal, or remote input signal; addressing means or an addressing unit for addressing a remote communications device identified by an address code, where the address code may comprise a telephone number or paging telephone number, the addressing may occur after verification that the received input signal matches a stored code, the stored code may comprise an access code and where the access code may in turn comprise a DTMF signal or signals; transmission means or a transmission unit for transmitting stored CID information to the addressed communications device, where the CID information may comprise CID messages or DTMF signals; first memory means or memory unit for storing the CID information; where the transmission means or unit may further comprise means for transmitting an OGM message to prompt input of the input signal and means or a unit for transmitting a signal, such as a star tone signal, in between transmission of stored CID information; verification means or a verification unit for verifying that the received input signal matches a stored code, where the stored code may comprise an access code; detection means or a detecting unit for detecting a call termination signal, where addressing may occur after detection of a call termination signal; receiving means or a receiving unit for receiving a message entry tone, where transmission of CID information may occur after receipt of a message entry tone; halting means or a halting unit for halting the transmission of CID information upon receipt of a second input signal, where the second input signal may comprise a pager full signal or paging system full signal; second memory means or memory unit for storing CID messages; detection means or a detection unit for detecting the presence of a full or partial CID message in a second memory unit; transmission means or a transmission unit further adapted to transmit a full CID message upon detection of a partial CID message in a message memory; halting means or a halting unit for halting transmission of the CID information upon transmission of all of the stored CID information; receiving means or a receiving unit for receiving an address code which identifies a remote communications device; selection means or a selecting unit for selecting an address code, associated with a received access code, from stored address codes. The device may further comprise a telephone, standalone CID device, a TAD, a PBX system or a combination of a CID and TAD device. The remote communications device may comprise a pager or paging system.

In accordance with other embodiments of the present invention programmed devices are provided which send or transmit stored CID information or messages to a remote communications device. Such devices may comprise program memory means or a program memory. The program memory may comprise: program code or program code means for addressing a remote communications device identified by an address code upon receipt of an input signal, where the input signal may comprise an access code, local input signal or remote input signal and where the address code may comprise a telephone number or paging telephone number; program code or program code means for transmitting stored CID information to an addressed communications device, where the CID information may comprise CID messages or DTMF signals; program code or program code means for transmitting an outgoing ("OGM") message to prompt input of an input signal; program code or program code means for verifying that a received input signal matches a stored code, where the stored code may comprise an access code and the access code may comprise a DTMF signal; program code or program code means for addressing a remote communications device after verification that a received input signal matches a stored code, where the stored code may comprise an access code; program code or program code means for detecting a call termination signal, where addressing may occur after detection of the call termination signal; program code or program code means for transmitting CID information after receipt of a message entry tone; program code or program code means for transmitting a signal, such as a star tone signal, in between transmission of stored CID information; program code or program code means for halting the transmission of CID information upon receipt of a second input signal, where the second input signal may comprise a pager full signal or paging system full signal; program code or program code means for detecting the presence of a full or partial CID message in a message memory; program code or program code means for transmitting a full CID message upon detection of a partial CID message in a message memory; program code or program code means for halting transmission after transmitting of all stored CID information; and program code or program code means for selecting an address code, associated with a received access code, from stored address codes. The programmed device may further comprise, for example, a telephone, digital signal processor, microprocessor or the like. The remote communications device may comprise, for example, a pager or paging system.

Other embodiments of the present invention provide for methods for sending CID information stored in a local communications device to a remote communications device. Such methods may comprise: receiving an input signal, where the input signal may comprise an access code, a local input signal or remote input signal; addressing a remote communications device identified by an address code, where the address code may comprise a telephone number or paging telephone number; transmitting stored CID information to an addressed communications device, where the CID information may comprise CID messages or DTMF signals; outputting an OGM message for prompting input of an input signal; verifying that a received input signal matches a stored code, where the stored code may comprise an access code; addressing a remote communications device after verification that a received input signal matches a stored code, and where, again, the stored code may comprise an access code, and where the access code may in turn comprise a DTMF signal or signals; detecting a call termination signal; addressing a remote communications device after detection of a call termination signal; receiving a message entry tone; transmitting stored CID information after receipt of a message entry tone; transmitting a signal, such as a star tone signal, in between transmission of stored CID information; halting the transmission of CID information upon receipt of a second input signal, where the second input signal may comprise a pager full signal; storing CID messages in a message memory; detecting the presence of a full or partial CID message in a message memory; transmitting a full CID message upon detection of a partial CID message in a message memory; halting the transmission of the CID information upon the transmission of all of the stored CID information; receiving an address code which identifies a remote communications device; selecting the address code, associated with a received access code, from stored address codes. These inventive methods may be used with a local communication device which may comprise, for example, a telephone, communications central office, standalone CID device, TAD, PBX system, or a combination of one or more of these devices and a remote communications device which may comprise, for example, a paging device or paging system.

The present invention and its advantages can be best understood with reference to the drawings, detailed description of the preferred embodiments and claims that follow.

DESCRIPTION OF THE PREFERRED
EMBODIMENTS

Figure 1:
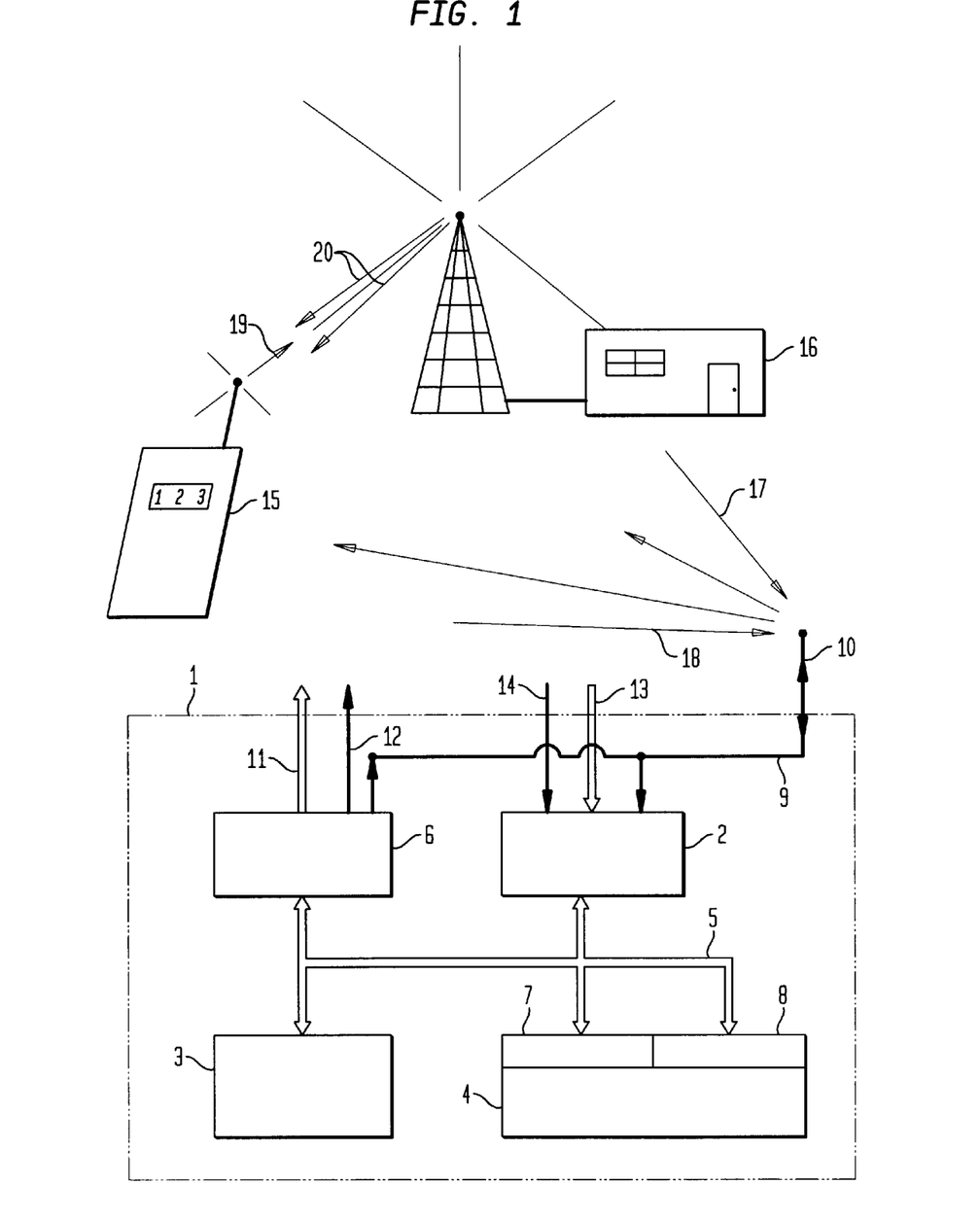
FIG. 1 depicts a device for sending CID information to a remote communications device according to one embodiment of the present invention.

Referring first to FIG. 1, there is shown one embodiment of an inventive CID information device 1. CID messages are commonly received and shown on a display (not shown) for visual notification. This displayed information may also be input into the device 1. The information may be input by any one of many known means, including manually, and is received by receiving unit, receiver or receiving means 2. This receiver 2 comprises electronics well known to those in the art and may take the form of an input/output unit capable of receiving both parallel 13 and serial 14 data, information or messages. Once received, this CID information may be stored in first memory means or first memory unit 3 via internal bus 5. The exact size of the memory 3 will depend on the amount of CID information to be stored. The inventive device 1 will work equally well with a range of memory capacities. The CID information will remain stored in memory 3 until a remote or local communications device such as a paging system 16 or pager 15 sends a request 17,18 that the CID information be forwarded on. In this manner a user of the inventive device 1 is not limited to accessing her CID information or messages by visually viewing them on a display; she may now view them while she is physically separated from the device 1, for example, by viewing the CID information or messages on a pager 15. This "request" may originate directly from the user of a pager 15 or may involve the routing of such a request through a paging distribution system 16 via communication signals or exchanges 19,20. The request may also originate more locally using local input signals 13,14. Typically, such a request will come via wireless frequency transmission 17,18 but may come via other means known to those in the art. The paging system 16 may be referred to as a pager or remote communications device when, in fact, it actually comprises a system.

In either case, whether the request originates remotely or locally, an input signal is received by the receiver 2 via input paths 10, 13, 14 or like pathways. The input signal may comprise a number of signals, such as an access code or password, which is required to be entered for security purposes as well as for accounting, i.e., only those who have paid a fee can access the device 1. This access code may additionally take the form of DTMF type signals. Once received, the input signal may be compared to stored codes or access codes by control unit 4 which may further comprise verification means or a verification unit for verifying that the received input signal matches a stored code or stored access code. These stored access codes may be stored in the first memory unit 3 or as a part of memory contained in control unit 4.

After receiving the input signal 10,13 or 14 the device I then proceeds to address a remote communications device 15,16 identified by an address code using addressing means or addressing unit 7. This address code may comprise a telephone number or paging telephone number which identifies a pager 15 or paging system 16. The device 1 is now prepared to transmit stored CID information to a remote communications device. In an alternative embodiment of the present invention, the device 1 will only address a remote communications device after verification by the verification unit that the received input signal 10,13 or 14 matches a stored code or access code.

Transmission of the stored CID information to an addressed, remote communications device 15,16 is carried out by transmission means or transmission unit 6. After transmission of stored CID information to the remote communications device 15,16 the CID information may then be displayed on a display or the like which is a part of the remote communications device.

As used in the examples above and those that follow, the words "local communications device" or "local device" describe a device or system which stores the CID information. The words "remote communications device" or "remote device" describe a device or system which receives transmitted CID information from the local device. It should be understood that the remote communications device 15,16 may, in some cases, be the origin or source of a "remote" input signal 10. In other instances the input signal which initiates the request to transmit CID information may originate from a different source.

The above embodiments of the present invention presume that the input signal is first received by device 1 from remote devices 15,16 or another source. That is, the user of the remote device (or another having access to device 1) sends a request to device 1 to forward on CID information or messages. The present invention envisions, however, embodiments which prompt the sending of input signals before they are received by the device 1. In such an embodiment of the present invention, the transmission unit or means may further comprise means for transmitting an outgoing message ("OGM") or similar message. This OGM message prompts a source to transmit the input signal to device 1. If the source is a user of a remote device 15,16, the user may be prompted by an audio OGM to transmit an input signal. Similarly, this prompt may occur after the initial receipt of an input signal, but before transmission of any CID information. For example, the input signal may comprise a number of signals such as a message entry tone, access code and address code to name but a few. The present invention envisions embodiments where the transmission unit 6 transmits an OGM type message after receipt of a message entry tone but before transmission of CID information. The OGM message may be used to remind the user to input an access code or to enter a correct access code if an error has occurred. The OGM message may be transmitted at other times during transmission of the input signal. There are any number of specific OGM type messages which may be selected and times when they may be transmitted. The example above should in no way be interpreted as limiting the transmission of the OGM message to a time right after the message entry tone.

The address code used by the device 1 to address the remote communication device 15,16 may be a part of the input signal, may originate from separate input signals or may be stored in first memory unit 3 or the like. For example, when the input signal comprises the address code the device 1 will receive the address code via receiving unit 2 and will use the received address code as a means of identifying and addressing a remote communications device which will receive CID information transmissions. Alternatively, the address code may be selected from stored address codes. Each received input signal may be "mapped" or linked to a unique stored, address code. Upon receipt of the input signal 10,13 or 14, a selection unit or means selects the stored address code which has been "mapped" to the particular input signal. The selection unit may be a part of control unit or control means 4.

Other embodiments of the present invention comprise different features which may be included in the inventive device 1. For example, the receiving unit or receiving means 2 may additionally comprise a first unit or means for detecting a call termination signal. This signal indicates that the input signal is no longer being received. Detection of the call termination signal acts as a "starting" point signal. A typical sequence of events would be reception of an input signal, termination of the input signal, detection of a call termination signal followed by addressing of the remote communications device and transmission of stored CID information. The device 1 may also await the reception of a message entry tone from the remote communications device before transmitting CID information. The message entry tone is a signal which, among other things, tells the device 1 that the remote device is ready to accept CID information or messages. Accordingly, the receiving unit or means 2 may comprise a unit or means for receiving a message entry tone.

It should be understood that the sequence of events outlined above is for illustration purposes only, there being any number of variations which may be used to achieve the same result.

The present invention envisions that the device 1 may take the form of, or be made a part of, any number of devices, such as a telephone, communications central office, standalone CID, TAD, PBX system or a combination of one or more the devices just mentioned or like devices.

Likewise, the remote communications device 15,16 may comprise a pager, paging systems or the like.

In addition to the call termination and message entry tone features, the inventive device 1 may also comprise additional features related to the transmission of CID information. Because CID information most often may comprise many separate CID messages, e.g., telephone numbers, it is desirable to provide a remote communications device 15,16 with a signal which enables it to recognize a transition from one message to another. One such signal is referred to as a "star" tone signal. One way to accomplish this is through the use of an alternate embodiment of the transmission unit 6. This unit 6 may therefore additionally comprise a unit or means for transmitting a star tone signal in between transmission of stored CID information or messages. The CID transmission stream will supply the remote device 15,16 with an information stream which comprises a CID message followed by a star tone signal, followed by a second CID message, followed by a star tone signal, etc.. until all of the CID messages are sent or until another signal interrupts transmission. The star tone signal is merely one example of a signal that may be used to denote a transition between two CID messages. Other tones, signals or tone combinations may be employed for this purpose.

One signal which may interrupt transmission of CID information is a paging system full signal or pager full signal. This signal originates at a pager or paging system such as the remote communications devices 15,16 shown in FIG. 1. As its name implies, this signal is sent by a pager when its message memory is full or when it no longer has the capacity to accept additional messages. Such a second input signal may be sent to the device 1 as an indication that the remote communications device 15,16 can no longer accept CID information or messages. This second input signal may be received by receiving unit 2. Thereafter, the control unit 4 may receive the second input signal via internal bus 5. Halting means or a halting unit which may be a part of the control unit 4 halts the transmission of CID information upon receipt of the second input signal. When this second input signal is sent by a pager 15 it may be referred to as a pager full signal; when it is sent by a paging system 16 it may be referred to as paging system full signal. It should be understood that the second input signal may comprise any "all full" signal which originates from a number of devices, only two of which are the pager or paging system mentioned above.

Transmission of CID information begins again after receipt of an appropriate signal, such as a message entry tone, from the pager 15.

Sometimes an "all full" signal causes the device 1 to halt transmission of CID information while in the midst of transmitting an individual CID message. Depending on the timing of the "all full" signal, perhaps only a portion of a particular message will have been transmitted. There is a danger that the partially transmitted and received message may not be re-transmitted in full and, thus, the message will be "lost". To guard against this scenario, the present invention envisions alternate embodiments which insure that messages will not be lost.

The device 1 may comprise a second memory unit or means 8 for storing CID messages. The CID message currently being transmitted to the remote device 15,16 is stored in second memory unit 8 prior to and during transmission. When transmission is halted, second detection unit or detection means detects whether the second memory unit 8 is full or partially full. If the second memory unit 8 is partially fill this is an indication that less than a full or complete message had been transmitted prior to a halt in transmission. When such a condition is found device 1 will re-transmit the full message last stored in memory 8 when transmission resumes after receiving the message from first memory 3. If on the other hand a full message is detected by the detection unit, this is an indication that a complete message had been transmitted and a "next" message had been received from memory 3 prior to a halt in transmission or the halt occurred just before a next message had begun to be transmitted. When this condition is found, the detected complete message is transmitted once transmission resumes.

The detection unit may be a part of control unit 4 and may be used to detect whether the second memory 8 is empty. An "empty" state is one indication that all of the stored CID information has been forwarded from memory 3 to memory 8 and has been transmitted. Once such an empty state is detected the halting unit halts transmission of CID information.

The receiving unit 2, memory unit 3, control unit 4 and transmission unit 6 are all shown as separate units for ease of understanding. It should be understood that one or more of these units may be combined into one unit or separated further into additional units.

Other embodiments of the present invention comprise methods for sending or transmitting CID information stored in a local communications device or system to a remote communications device. The inventive methods may involve the use of many different types of local and remote devices or systems. Examples of devices or systems which may be utilized include a central office of a telephone, paging or communications company or a device like that shown in FIG. 1.

An exemplary method for sending CID information stored in a local communications device or system to a remote communications device according to the present invention may comprise: receiving an input signal such as signals 10,13, or 14 shown in FIG.1, where the input signal may further comprise an access code, local input signal 13,14 or remote input signal 10 and where the access code may further comprise DTMF type signals; addressing a remote communications device 15,16 identified by an address code, where the address code may comprise a telephone number or paging telephone number and where the remote device may comprise a pager or paging system; and transmitting stored CID information to the addressed communications device 15,16, where the CID information may comprise DTMF type signals. Other embodiments may further comprise additional features such as: outputting an OGM message to prompt transmission of the input signal to the local device; verifying that a received input signal matches a stored code, where the stored code may comprise an access code and where addressing may occur after verification that the received input signal matches the stored code.

Still other embodiments relate to methods which comprise features directed at controlling the transmission rate of CID information being transmitted to a remote communications device 15,16. For example, the present invention envisions methods which comprise: detection of a call termination signal, where addressing a remote communications device 15,16 may occur after detection of the call termination signal; receiving a message entry tone, where transmission of CID information may occur after receipt of the message entry tone; transmitting a signal, such as a star tone signal, in between transmission of stored CID information, where the CID information may comprise one or a number of distinct CID messages; halting the transmission of CID information to a remote communications device 15,16 upon receipt of a second input signal, where the second input signal may comprise a pager full signal or a paging system full signal; storing CID messages in a message memory; detecting the presence of a full or partial CID message in the message memory; transmitting a full CID message upon detection of a partial CID message in the message memory; and halting transmission upon the transmission of all of the stored CID information.

Other methods are directed at the addressing features of the present invention. These embodiments comprise receiving the address code which identifies a remote communications device from the remote communications device 15,16 or another external source and/or selecting the address code, associated with the received access code, from stored address codes.

Figure 2:
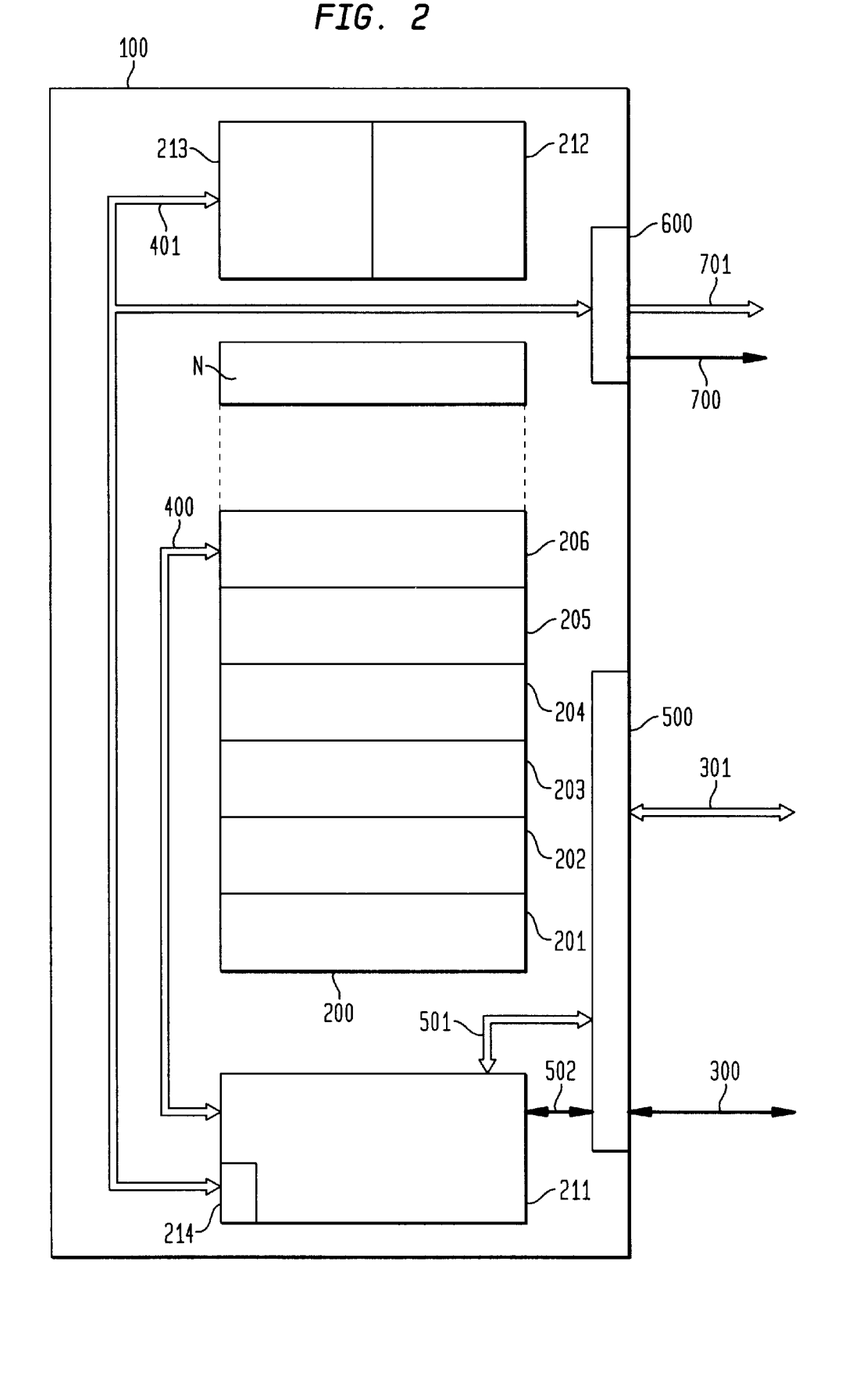
FIG. 2 depicts a programmed device for sending CID information to a remote communications device according to another embodiment of the present invention.

FIG. 2 shows another embodiment of the present invention which depicts a programmed device 100 for sending stored CID information to a remote communications device.

This programmed device 100 may be a part of a larger device, such as the device shown in FIG. 1, or may be part of a system such as the central office of a telephone, paging or communications company. Many of the functions of the individual hardware components shown in FIG. 1 can be realized by the programmed device.

The programmed device 100 may comprise a program memory, program memory means or the like 200 for storing program code, program code means or the like 201-N. The programmed device 100 receives an input signal 300 or 301 using input/output unit ("I/O") 500 or other techniques well known in the art. Upon receipt of this input signal 300,301 the I/O unit 500 may forward the input signal to control unit 211 or the like via buses 501 or 502. This internal signal may take the form of an interrupt or the like. The control unit 211 then selects program code or code means 201 for addressing a remote communications device. The program code means 201-N are shown in simplified functional form, it being well known to those in the art, however, that code means 201-N comprise microscopic electronic circuitry. Control unit 211 or the like may receive instructions, signals or the like from program code means 201 and may fetch an address code which identifies a remote communications device. These address codes may comprise a telephone number or a paging telephone number. It should be understood that the actual physical connection between the control unit 211, code means 201-N and other components of programmed device 100 and the way they interact with each other is for illustration purposes only in order to provide an explanation of the present invention. Many physical designs other than the ones discussed here, known to those in the art, may be used to realize the advantages offered by the present invention.

The address code may be used to initiate the addressing of a remote communications device through address unit 600 or the like and signals or pathways 700,701. The control unit then selects program code or code means 202 for transmitting stored CID information to the addressed communications device. The transmitted CID information may be initially stored in message memory 212 and may comprise a number of distinct CID messages.

As with other embodiments of the present invention, the input signal 300,301 may comprise an access code or password which must be entered by a user to trigger operation of the device 100. The input signal 300,301 may originate locally as a "local" input signal or originate from a remote source as a "remote" input signal. The device 100, however, may prompt a user or external device to transmit an input signal 300,301. To this end, the program code means 202 may further comprise program code or code means for transmitting an OGM message to prompt input of the input signal. Transmission of the CID information and OGM type messages may be initiated by I/O unit 500 or the like and bidirectional pathways 300,301 or the like or by other means known to those in the art.

The present invention envisions other embodiments where the programmed device 100 comprises additional "intelligence" or features. The programmed device 100 may further comprise program code or code means 203 for verifying that the received input signal 300,301 matches a stored code. This stored code may comprise an access code or, more specifically, may comprise DTMF type signals. These access codes may be stored in memory unit 213. In conjunction with code means 203, addressing code means 201 may further comprise program code or code means for addressing a remote communications device after verification that the received input signal matches a stored code.

The programmed device 100 may comprise the added ability to detect termination of an input signal 300,301 using I/O unit 500 or other means known to those in the art. Addressing of the remote communications device may await detection of such a call termination signal. To provide this capability, addressing code means 201 may further comprise additional program code or means for addressing the remote communications device after detection of the call termination signal. Input signal 300,301 may comprise the address code, or the address code or codes may be stored in memory 213. In the latter case, the programmed device 100 may comprise program code means 206 for selecting the address code, associated with a received access code, from stored address codes. As used here, the received access code comprises part of the input signal 300,301.

Transmission of the stored CID information from message memory 212 may be affected by the receipt of a number of additional signals. In the event a message entry tone is sent by a remote device, the transmitting code means 202 may further comprise code or code means for transmitting CID information after receipt of the message entry tone. The device 100 may further comprise program code or code means 204 for halting transmission of CID information upon receipt of a pager full, paging system full or similar second input signal. Once transmission has been halted the device 100 may then utilize program code or code means 205 for detecting the presence of a full or partial CID message in second message memory 214. Transmitting program code means 202 may further comprise code or code means for transmitting a full CID message upon detection of a partial CID message in the second message memory 214. At some point all of the CID messages will be transmitted. The device 100 is continually checking to see if the second message memory is full or empty. In the event the memory 214 is empty then transmission is halted. To this end, halting code means 204 may further comprise halting code or code means for halting transmission when all of the CID information has been transmitted.

Other embodiments of the programmed device 100 comprise features which allow a remote device to separate out distinct CID messages contained in the CID information stream. Transmitting program code 202 may still further comprise code or code means for transmitting a signal, such as a star tone signal, in between transmission of stored CID information or messages. This signal, once received, allows a remote communications device to distinguish between the many messages which may be contained in the CID information stream.

The programmed device 100 itself may comprise a digital signal processor, microprocessor or the like and is typically, but not always, a part of a larger device or system such as a telephone or telephone central office. The remote communications device which is receiving the CID information may typically comprise a pager, paging system or the like.

It is to be understood that changes and variations may be made without departing from the spirit and scope of this invention as defined by the claims that follow.

We claim:

1. A device comprising:
   a receiving unit for receiving CID messages and an input signal;
   a CID message memory unit for storing the received CID messages;
   a transmission unit for transmitting stored CID messages to a remote communications device;
   a halting unit adapted to halt the transmission of CID messages upon receipt of a second input signal;
   another memory unit adapted to store at least a full or partial CID message at the time the transmissions are halted;
   a first detection unit adapted to detect a call termination signal;
   and a second detection unit adapted to detect the presence of at least a fill or partial CID message in the memory unit which stores the at least full or partial CID message,
   wherein the transmission unit is further adapted to transmit a full CID message upon detection of a partial CID message in the memory unit.

2. The device as in claim 1 wherein the first input signal comprises an access code.

3. The device as in claim 2 wherein the access code comprises a DTMF signal.

4. The device as in claim 1 wherein the first input signal comprises a local input signal.

5. The device as in claim 1 wherein the first input signal comprises a remote input signal.

6. The device as in claim 1 wherein the transmission unit further comprises a unit for transmitting an OGM message to prompt input of the first input signal.

7. The device as in claim 1 further comprising a verification unit for verifying that the first input signal matches a stored code.

8. The device as in claim 7 wherein the stored code comprises an access code.

9. The device as in claim 7 further comprising an addressing unit adapted to address the communications device after verification that the first input signal matches a stored code.

10. The device as in claim 9 wherein the stored code comprises an access code.

11. The device as in claim 10 wherein the access code is a DTMF signal.

12. the device as in claim 1 further comprising an addressing unit adapted to address the communications device after detection of the call termination signal.

13. The device as in claim 1 wherein the receiving unit further comprises a unit for receiving a message entry tone.

14. The device as in claim 13 wherein the transmission unit is further adapted to transmit the CID messages after receipt of the message entry tone.

15. The device as in claim 1 wherein the transmission unit further comprises a unit for transmitting a signal in between transmission of stored CID messages.

16. The device as in claim 15 wherein the signal transmitted between the transmission of stored CID information comprises a star tone signal.

17. The device as in claim 1 wherein the second input signal comprises a pager full signal.

18. The device as in claim 1 wherein the second input signal comprises a paging system full signal.

19. The device as in claim 1 wherein the halting unit is further adapted to halt transmission after all of the stored, received CID messages have been transmitted.

20. The device as in claim 1 wherein the receiving unit is further adapted to receive an address code which identifies the remote communications device.

21. The device as in claim 20 further comprising a selection unit for selecting the address code, associated with the first input signal, from stored address codes.

22. The device as in claim 20 wherein the address code comprises a telephone number.

23. the device as in claim 22 wherein the telephone number comprises a paging telephone number.

24. The device as in claim 1 wherein the device comprises a standalone CID device.

25. The device as in claim 1 wherein the device comprises a TAD.

26. The device as in claim 1 wherein the device comprises a PBX system.

27. The device as in claim 1 wherein the device comprises a combination of a CID and TAD device.

28. The device as in claim 1 wherein the device comprises a telephone.

29. The device as in claim 1 wherein the remote communications device comprises a pager.

30. The device as in claim 1 wherein the remote communications device comprises a paging system.

31. A device for sending CID messages to a remote communications device:
   receiving means for receiving CID messages and an input signal;
   first detection means for detecting the CID messages;
   received, CID message memory for storing the CID messages;
   addressing means for addressing a remote communications device identified by an address code;
   transmission means for transmitting stored CID messages to the addressed communications device;
   halting means for halting the transmission of CID messages upon receipt of a second input signal;
   another memory means for storing at least a full or partial CID message at the time the transmissions are halted; and
   second detection means for detecting the presence of at least a full or partial CID message in the memory unit which stores the at least full or partial CID message,
   wherein the transmission means is further adapted to transmit a full CID message upon detection of a partial CID message in the memory means.

32. The device as in claim 31 wherein the first input signal comprises an access code.

33. The device as in claim 32 wherein the access code comprises a DTMF signal.

34. The device as in claim 31 wherein the first input signal comprises a local input signal.

35. The device as in claim 31 wherein the first input signal comprises a remote input signal.

36. The device as in claim 31 wherein the transmission means further comprises means for transmitting an OGM message to prompt input of the first input signal.

37. The device as in claim 31 wherein the address code comprises a telephone number.

38. The device as in claim 37 wherein the telephone number comprises a paging telephone number.

39. The device as in claim 31 further comprising verification means for verifying that the first input signal matches a stored code.

40. The device as in claim 39 wherein the stored code comprises an access code.

41. The device as in claim 39 wherein the addressing means is further adapted to address the remote communications device after verification that the first input signal matches a stored code.

42. The device as in claim 41 wherein the stored code comprises an access code.

43. The device as in claim 42 wherein the access code is a DTMF signal.

44. The device as in claim 31 wherein the first detection means is further adapted to detect a call termination signal.

45. The device as in claim 44 wherein the addressing means is further adapted to address the remote communications device after detection of the call termination signal.

46. The device as in claim 31 wherein the receiving means further comprises receiving means for receiving a message entry tone.

47. The device as in claim 46 wherein the transmission means is further adapted to transmit the CID messages after receipt of the message entry tone.

48. The device as in claim 31 wherein the transmission means further comprises means for transmitting a star tone signal in between transmission of stored CID messages.

49. The device as in claim 31 wherein the second input signal comprises a pager full signal.

50. The device as in claim 31 wherein the second input signal comprises a paging system full signal.

51. The device as in claim 31 wherein the halting means is further adapted to halt transmission after all of the stored, received CID messages have been transmitted.

52. The device as in claim 31 wherein the receiving means receives the address code which identifies the remote communications device.

53. The device as in claim 31 further comprising selection means for selecting the address code, associated with the first input signal, from stored address codes.

54. The device as in claim 31 wherein the device comprises a standalone CID device.

55. The device as in claim 31 wherein the device comprises a TAD.

56. The device as in claim 31 wherein the device comprises a PBX system.

57. The device as in claim 31 wherein the device comprises a combination of a CID and TAD device.

58. The device as in claim 31 wherein the device comprises a telephone.

59. The device as in claim 31 wherein the remote communications device comprises a pager.

60. The device as in claim 31 wherein the remote communications device comprises a paging system.

61. A programmed device for sending stored CID messages to a remote communications device, the programmed device comprising a program memory, the program memory comprising:

program code for addressing a remote communications device identified by an address code upon receipt of a first input signal;

program code for transmitting stored CID messages to the addressed communications device;

program code for halting the transmission of CID messages upon receipt of a second input signal;

program code for storing at least a full or partial CID message at the time the transmissions are halted; and program code for detecting the presence of at least a full or partial stored CID message in a message memory, wherein the program code for transmitting is adapted to further transmit a full CID message upon detection of a stored partial CID message in the message memory.

62. The programmed device as in claim 61 wherein the first input signal comprises an access code.

63. The programmed device as in claim 61 wherein the first input signal comprises a local input signal.

64. The programmed device as in claim 61 wherein the first input signal comprises a remote input signal.

65. The programmed device as in claim 61 wherein the program code for transmitting stored messages further comprises program code for transmitting an OGM message to prompt input of the first input signal.

66. The programmed device as in claim 61 wherein the address code comprises a telephone number.

67. The programmed device as in claim 66 wherein the telephone number comprises a paging telephone number.

68. The programmed device as in claim 61 further comprising program code for verifying that the first input signal matches a stored code.

69. The programmed device as in claim 68 wherein the stored code comprises an access code.

70. The programmed device as in claim 68 wherein the program code for addressing the remote communications device further comprises program code for addressing the remote communications device after verification that the first input signal matches a stored code.

71. The programmed device as in claim 70 wherein the stored code comprises an access code.

72. The programmed device as in claim 71 wherein the access code is a DTMF signal.

73. The programmed device as in claim 61 wherein the program code for addressing further comprises program code for addressing the remote communications device after detection of a call termination signal.

74. The programmed device as in claim 61 wherein the program code for transmitting is further adapted to transmit the CID messages after the receipt of a message entry tone.

75. The programmed device as in claim 61 wherein the program code for transmitting stored CID messages further comprises program code for transmitting a star tone signal in between transmission of stored CID messages.

76. The programmed device as in claim 61 wherein the second input signal comprises a pager full signal.

77. The programmed device as in claim 61 wherein the second input signal comprises a paging system full signal.

78. The programmed device as in claim 61 wherein the program code means for transmitting CID information further comprises program code means for transmitting a full CID message upon detection of a partial CID message in the message memory.

79. The programmed device as in claim 61 wherein the program code for halting transmission is further adapted to halt transmission after all of the stored, received CID messages have been transmitted.

80. The programmed device as in claim 61 further comprising program code for receiving the address code which identifies the remote communications device from the first input signal.

81. The programmed device as in claim 61 further comprising program code for selecting the address code, associated with the first input signal, from stored address codes.

82. The programmed device as in claim 61 wherein the programmed device comprises a digital signal processor.

83. The programmed device as in claim 61 wherein the programmed device comprises a microprocessor.

84. The programmed device as in claim 61 wherein the remote communications device comprises a pager.

85. The programmed device as in claim 61 wherein the remote communications device comprises a paging system.

86. A method for sending CID messages stored in a local communications device to a remote communications device comprising:

receiving a first input signal;

storing received CID messages in a received, CID message memory;

addressing a remote communications device identified by an address code;

transmitting the stored CID messages to the addressed communications device;

halting the transmission of CID messages upon receipt of a second input signal;

storing at least a full or partial CID message at the time the transmissions are halted in another memory; and detecting the presence of at least a full or partial stored CID message, wherein the transmission of a full CID message occurs when a stored partial CID message is detected.

87. The method as in claim 86 wherein the first input signal comprises an access code.

88. The method as in claim 86 wherein receiving the first input signal comprises receiving a local input signal.

89. The method as in claim 86 wherein receiving the first input signal comprises receiving a remote input signal.

90. The method as in claim 86 further comprising transmitting an OGM message to prompt input of the first input signal.

91. The method as in claim 86 wherein the address code comprises a telephone number.

92. The method as in claim 91 wherein the telephone number comprises a paging telephone number.

93. The method as in claim 86 further comprising verifying that the first input signal matches a stored code.

94. The method as in claim 93 wherein the stored code comprises an access code.

95. The method as in claim 93 wherein addressing occurs after verification that the first input signal matches a stored code.

96. The method as in claim 95 wherein the stored code comprises an access code.

97. The method as in claim 86 further comprising detecting a call termination signal.

98. The method as in claim 96 wherein addressing occurs after detection of the call termination signal.

99. The method as in claim 86 further comprising receiving a message entry tone.

100. The method as in claim 99 wherein transmission occurs after receipt of the message entry tone.

101. The method as in claim 86 wherein transmission comprises transmitting a signal in between transmission of stored messages.

102. The method as in claim 101 wherein the signal transmitted in between the transmission of stored CID messages comprises a star tone signal.

103. The method as in claim 86 wherein the second input signal comprises a pager full signal.

104. The method as in claim 86 wherein the second input signal comprises a paging system full signal.

105. The method as in claim 86 further comprising halting transmission when all of the stored, received CID messages have been transmitted.

106. The method as in claim 86 further comprising receiving the address code which identifies the remote communications device.

107. The method as in claim 86 further comprising selecting the address code, associated with the first input signal, from stored address codes.

108. The method as in claim 86 wherein the local communications device comprises a communications central office.

109. The method as in claim 108 wherein the communications central office comprises a telephone company central office.

110. The method as in claim 109 wherein the communications central office comprises a paging company central office.

111. The method as in claim 86 wherein the local communications device comprises a telephone.

112. The method as in claim 87 wherein the access code is a DTMF signal.

113. The method as in claim 86 wherein the remote communications device comprises a pager.

114. The method as in claim 86 wherein the remote communications device comprises a paging system.

* * * * *